(12) United States Patent
Li (10) Patent No.: US 11,106,737 B2
(45) Date of Patent: Aug. 31, 2021

(54) METHOD AND APPARATUS FOR PROVIDING SEARCH RECOMMENDATION INFORMATION

(71) Applicant: Baidu Online Network Technology (Beijing) Co., Ltd., Beijing (CN)

(72) Inventor: Feng Li, Beijing (CN)

(*) Notice: Subject to any disclaimer, the term of this patent is extended or adjusted under 35 U.S.C. 154(b) by 407 days.

(21) Appl. No.: 16/160,843

(22) Filed: Oct. 15, 2018

(65) Prior Publication Data

US 2019/0050413 A1 Feb. 14, 2019

Related U.S. Application Data

(63) Continuation of application No. PCT/CN2016/094877, filed on Aug. 12, 2016.

(30) Foreign Application Priority Data

Jun. 29, 2016 (CN) .......................... 201610500705.9

(51) Int. Cl.
*G06F 16/00* (2019.01)
*G06F 16/9032* (2019.01)
(Continued)

(52) U.S. Cl.
CPC .... *G06F 16/90324* (2019.01); *G06F 16/9035* (2019.01); *G06F 16/90335* (2019.01)

(58) Field of Classification Search
CPC ......... G06F 16/90324; G06F 16/90335; G06F 16/9035
See application file for complete search history.

(56) References Cited

U.S. PATENT DOCUMENTS

2008/0005068 A1 1/2008 Dumais et al.
2009/0228439 A1 9/2009 Manolescu et al.
(Continued)

FOREIGN PATENT DOCUMENTS

CN 104836720 A 8/2015
CN 104915369 A 9/2015
(Continued)

OTHER PUBLICATIONS

Gilbert et al., "Vision: Automated Security Validation of Mobile Apps at App Markets", MCS'11, Jun. 28, 2011, ACM, pp. 21-25. (Year: 2011).*

(Continued)

*Primary Examiner* — Cheryl Lewis
(74) *Attorney, Agent, or Firm* — Knobbe, Martens, Olson & Bear, LLP (57) ABSTRACT

Provided are methods and apparatuses for providing search recommendation information. The method can include acquiring, when a user performs a search in user equipment, search reference information corresponding to the user; determining search requirement information corresponding to the user based on search reference information; and providing corresponding search recommendation information based on the search requirement information. Compared with the existing technology, the present disclosure can have the following advantages. Based on the information flow data in the user equipment, the search requirement of the user is determined and the corresponding search recommendation information is provided, so that the obtained search recommendation information is more conformable to the current search requirement of the user, which breaks the traditional approach in which the search is performed only based on the query information inputted by the user. The (Continued)

search efficiency can be improved, and the accuracy of the recommendation information can be enhanced.

18 Claims, 1 Drawing Sheet

(51) Int. Cl.
  *G06F 16/9035* (2019.01)
  *G06F 16/903* (2019.01)

(56) References Cited

U.S. PATENT DOCUMENTS

| | | | |
|---|---|---|---|
| 2012/0053829 | A1 | 3/2012 | Agarwal et al. |
| 2012/0203733 | A1 | 8/2012 | Zhang |
| 2013/0196615 | A1* | 8/2013 | Zalmanovitch ..... H04M 15/854 455/405 |
| 2015/0046418 | A1 | 2/2015 | Akbacak |

FOREIGN PATENT DOCUMENTS

| | | |
|---|---|---|
| CN | 105095383 A | 11/2015 |
| CN | 105095474 A | 11/2015 |
| CN | 105556516 A | 5/2016 |
| CN | 105574174 A | 5/2016 |
| EP | 2518978 A2 | 4/2012 |
| EP | 2688014 | 1/2014 |
| JP | 2001209646 A | 8/2001 |
| JP | 200603987 A | 2/2006 |
| JP | 2015106354 A | 6/2015 |

OTHER PUBLICATIONS

Liao et al., "On Mining Mobile Apps Usage Behavior for Predicting Apps Usage in Smartphones", CIKM'13, Oct. 27-Nov. 1, 2013, ACM, pp. 209-611. (Year: 2013).*
International Search Report dated Mar. 31, 2017 for International Application No. PCT/CN2016/094877, 6 pages.
Written Opinion of the International Searching Authority dated Mar. 31, 2017 for International Application No. PCT/CN2016/094877, 4 pages.

* cited by examiner

METHOD AND APPARATUS FOR PROVIDING SEARCH RECOMMENDATION INFORMATION

CROSS REFERENCE TO RELATED APPLICATIONS

This is a continuation of International Application PCT/CN2016/094877, with an international filing date of Aug. 12, 2016, which claims priority to Chinese Application No. 201610500705.9, filed on Jun. 29, 2016, entitled "Method and Apparatus for Providing Search Recommendation Information," the contents of each of which are incorporated herein by reference in their entireties.

TECHNICAL FIELD

The present disclosure relates to the field of computer technology, and specifically to a method and apparatus for providing search recommendation information.

BACKGROUND

The applications on the mobile device may generally learn the data in the applications and the operations performed by a user, and recommend information to the user based on the data and the operations. However, reference information such as a user profile or a user requirement that may be used to recommend information to the user is often hidden in the information flow data, for example, the operations of the user, the notifications, the short messages, or the photographs, of other applications in the mobile device. The information flow data has characteristics of heterogeneity, discreteness, disordering, or the like. Therefore, it is very difficult to use the information flow data.

ABSTRACT

An objective of the present disclosure is to provide a method and apparatus for providing search recommendation information.

According to an aspect of the present disclosure there is provided a method for providing search recommendation information. The method includes: acquiring, when a user performs a search in a user equipment, search reference information corresponding to the user, the search reference information including information flow data corresponding to one or more application programs in the user equipment; determining search requirement information corresponding to the user based on the search reference information; and providing corresponding search recommendation information based on the search requirement information.

According to an aspect of the present disclosure there is further provided a providing apparatus for providing a search result. The providing apparatus includes: a sub-apparatus, for acquiring, when a user performs a search in a user equipment, search reference information corresponding to the user, the search reference information including information flow data corresponding to one or more application programs in the user equipment; a sub-apparatus, for determining search requirement information corresponding to the user based on the search reference information; and a sub-apparatus, for providing corresponding search recommendation information based on the search requirement information.

As compared with the existing technology, the present disclosure can have the following advantages. Based on the information flow data in the user equipment, the search requirement of the user is determined and the corresponding search recommendation information is provided, so that the obtained search recommendation information is more conformable to the current search requirement of the user, which breaks the traditional approach in which the search is performed only based on the query information inputted by the user. Accordingly, the search efficiency is improved, and the accuracy of the recommendation information is enhanced. In addition, the solution according to the present disclosure can organize the information flow data, which facilitates the determination of the search requirement of the user.

BRIEF DESCRIPTION OF THE DRAWINGS

By reading detailed descriptions on non-limiting embodiments given with reference to the following accompanying drawings, other features, objectives and advantages of the present disclosure will become more apparent.

The same or similar reference numerals in the accompanying drawings represent the same or similar components.

DETAILED DESCRIPTION OF EMBODIMENTS

The present disclosure is further described in detail below in combination with the accompanying drawings.

Figure 1:
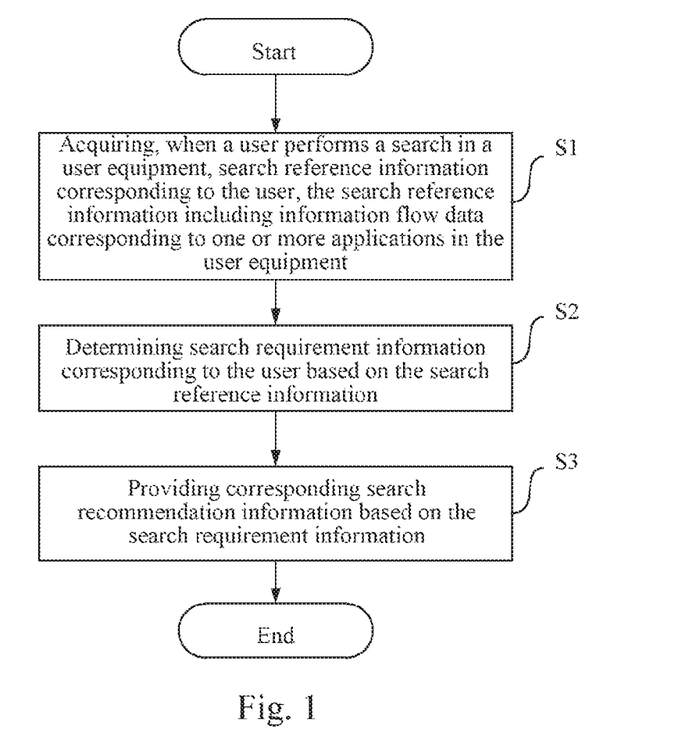
FIG. 1 illustrates a flowchart of a method for providing search recommendation information according to some embodiments of the present disclosure.

FIG. 1 illustrates a flowchart of a method for providing search recommendation information according to some embodiments of the present disclosure. The method according to the present disclosure includes step S1, step S2, and step S3.

The method according to some embodiments of the present disclosure is implemented by the providing apparatus included in a computer device. The computer device includes an electronic device capable of automatically performing a numerical calculation and/or information processing according to a preset or pre-stored instruction. The hardware of the electronic device includes, but is not limited to, a microprocessor, an application specific integrated circuit (ASIC), a programmable gate array (FPGA), a digital signal processor (DSP), and an embedded device. The computer device includes a network device and/or a user equipment. The network device includes, but is not limited to, a single network server, a server group composed of a plurality of network servers, or a cloud computing based cloud composed of a large number of mainframes or network servers. The cloud computing is one of the distributed computing, and is implemented by a super virtual computer composed of a group of loosely coupled computer sets. The user equipment includes, but is not limited to, any electronic product that may interact with a user through a keyboard, a mouse, a remote controller, a touch pad, or a voice control device, for example, a personal computer, a tablet computer, a smart phone, a PDA, a game console, or an IPTV. Preferably, the user equipment includes a mobile device such as the smart phone.

The network where the user equipment and the network device are located includes, but is not limited to, the Internet, a wide area network, a metropolitan area network, a local area network, and a VPN network.

It should be noted that the user equipment, the network device, and the network are only examples. If other existing or future possible user equipments, network devices, and networks may be applicable to some embodiments of the present disclosure, the user equipments, the network devices, and the networks should also be included in the scope of protection of the present disclosure, which are hereby incorporated by reference.

Referring to FIG. 1, in step S1, when the user performs a search in the user equipment, the providing apparatus acquires search reference information corresponding to the user.

The search reference information includes information flow data corresponding to one or more applications in the user equipment.

The information flow data includes data such as an operation, a notification, a short message, and a photograph.

Preferably, the search reference information may include information obtained by organizing the information flow data. For example, by performing a semantic analysis operation on the collected information flow data, the main information of the information flow data is used as the search reference information.

Preferably, the providing apparatus collects the information flow data by performing step S4 (not shown).

In step S4, the providing apparatus collects one or more items of information flow data generated in the user equipment, to obtain corresponding search reference information based on the one or more items of the information flow data and store the corresponding search reference information.

Specifically, the providing apparatus may use time information and content information respectively corresponding to the collected one or more items of the information flow data as the search reference information and store the search reference information.

Preferably, the providing apparatus organizes each item of information flow data in the collected information flow data in a predetermined form, to obtain the tag information corresponding to the each item of information flow data to be used as the search reference information and store the search reference information.

The tag information includes at least one of the following information.

1. Time information. The time information is used to indicate the time when the information flow data is generated.

2. Category information. The category information includes various types of information that may be used to classify the information flow data. For example, the information flow data is classified into "application notification," "short message," or "user operation" based on an information type.

3. Source information. The source information is used to indicate the application that generates the information flow data.

4. Content abstract information. The content abstract information includes text abstract information, for example, abstract information extracted from the content of the short message. Preferably, the content abstract information further includes abstract information obtained through the image recognition and the video recognition.

For example, when the user takes a high-definition selfie photo at Tiananmen, based on the user operation, the providing apparatus may use the information "daytime, Beijing Tiananmen, and sunny" obtained by performing the image recognition on the photo as the content abstract information.

5. Intent information. The intent information includes various kinds of information that may reflect search intents of the user. For example, based on a predetermined derivation rule acquired based on a large amount of user data, the intent information corresponding to the notification information of a shopping application is "online shopping" and "express inquiry." As another example, based on attributes of the user such as the gender, the age, and the occupation, the intent information corresponding to other similar users is used as the intent information of the user.

According to the first example of the present disclosure, the providing apparatus is included in the search application app_1 in the smart phone. When the smart phone receives the notification message "the order has been processed! The long-sleeve dress you purchased has been sent" from the shopping application app_2, the providing apparatus collects the information flow data corresponding to the notification message in step S4. In addition, the providing apparatus organizes the information flow data in the predetermined form including five tags {time, category, source, content abstract, and intent}, to obtain the following search reference information info_1: the time: "9:00 pm on Apr. 5, 2016"; the category: "app notification"; the source: "app_2"; the content abstract: "the long-sleeve dress has been sent"; and the intent: "online shopping, and the long-sleeve dress." The providing apparatus stores the search reference information info_1 into the smart phone. When the user performs the search in the search application app_1, the providing apparatus acquires the search reference information info_1 corresponding to the user in one day.

It should be noted that the above example is only for better describing the technical solution of the present disclosure, rather than limiting the present disclosure. It should be understood by those skilled in the art that any implementation where the one or more items of information flow data generated in the user equipment are collected, to obtain the corresponding search reference information based on the one or more items of information flow data and store the search reference information should be included in the scope of the present disclosure.

Preferably, the providing apparatus may periodically perform the step S4 to collect the newest information flow data in the user equipment.

Preferably, the providing apparatus acquires an authorization setting operation of the user, to collect the one or more items of information flow data generated in the user equipment after being authorized by the user.

For example, the user may set access permissions for the information flow data such as the photograph, the short message, and the application notification in the user equipment. The providing apparatus collects the one or more items of information flow data generated in the user equipment based on the access permissions set by the user.

Preferably, if the providing apparatus is included in the network device, the providing apparatus may receive the information flow data coming from the user equipment.

Further referring to FIG. 1, in step S2, the providing apparatus determines the search requirement information corresponding to the user based on the search reference information.

The search requirement information includes various kinds of information for indicating search requirements of the user.

Specifically, the approaches of the providing apparatus determining the search requirement information corresponding to the user based on the search reference information include, but not limited to, any one of the followings.

1. The content of the search reference information is directly used as the search requirement information.

2. A part of the search reference information is selected as the search requirement information. For example, after the category tag and the intent tag of the each item of information flow data are obtained through organizing, the content of the category tag and the content of the intent tag are used as the search requirement information.

3. The search requirement information corresponding to the user is determined based on user related information and the search reference information.

The user related information includes various kinds of attribute information related to the user, for example, the age, the occupation, the marital status, and the preference.

Preferably, the providing apparatus may determine the search requirement information corresponding to the user related information based on a predetermined matching rule between the attribute information and the requirement information.

The first example is further described. The providing apparatus acquires the user related information corresponding to the user. When the user related information includes "female, 25 years old, programmer, and unmarried," the providing apparatus determines the requirement matching the user "women's Spring and Autumn clothing, and Bohemian style", according to the user related information and the predetermined matching rule. The providing apparatus uses the search reference information and the requirement information determined based on the user related information as the search requirement information corresponding to the user. Thus, the obtained search requirement information is "online shopping, long-sleeve dress, women's Spring and Autumn clothing, and Bohemian style."

4. One or more keywords are extracted from the search reference information to be used as the search requirement information corresponding to the user.

Preferably, when a plurality of pieces of candidate search requirement information are obtained, the providing apparatus calculates a weight of each piece of candidate search requirement information according to a predetermined weight calculation rule. Then, the providing apparatus sorts the plurality of pieces of candidate search requirement information according to the weight of the each piece of candidate search requirement information, and thus, at least one piece of candidate search requirement information in the front rank is selected.

Further referring to FIG. 1, in step S3, the providing apparatus provides corresponding search recommendation information based on the search requirement information.

The search recommendation information includes search result information obtained based on the search requirement information.

Specifically, the providing apparatus determines one or more pieces of extended query information corresponding to the search requirement information based on the search requirement information. Then, the providing apparatus performs the search based on the one or more pieces of extended query information, to obtain the corresponding search recommendation information.

For example, when the user inputs "inquiry" in a search box to perform the search, in step S2, the providing apparatus determines that the search requirement information corresponding to the user is "express." The providing apparatus uses "express" as the extended query word, and performs the search based on "inquiry" and "express" to obtain the corresponding search recommendation information.

Preferably, the providing apparatus provides the one or more pieces of extended query information for the user to select. Then, the providing apparatus performs the search based on the extended query information selected by the user to obtain the corresponding search recommendation information.

The first example is further described. Based on the search requirement information "online shopping, long-sleeve dress, women's Spring and Autumn clothing, and Bohemian style," the providing apparatus uses "online shopping," "long-sleeve dress," "women's Spring and Autumn clothing," and "Bohemian style," as the extended query information. In addition, the providing apparatus provides the four pieces of extended query information for the user through a prompt box. When the user selects the "Bohemian style" and "women's Spring and Autumn clothing," the providing apparatus performs the search based on the extended query information selected by the user, to obtain the corresponding search recommendation information.

Preferably, based on the query information inputted by the user and the one or more pieces of extended query information, the providing apparatus may present one or more kinds of corresponding search suggestion information for the user to select one kind of search suggestion information to perform the search.

For example, when the user inputs the query word "a" into the input box, and the extended query words collected by the providing apparatus are "b" and "c," the providing apparatus provides three kinds of search suggestion information "a+b," "a+c," and "a+b+c" in the input box for the user to select one to perform the search.

It should be noted that the above example is only for better describing the technical solution of the present disclosure, rather than limiting the present disclosure. It should be understood by those skilled in the art that any implementation where the corresponding search recommendation information is provided based on the search requirement information should be included in the scope of the present disclosure.

According to the method of some embodiments of the present disclosure, based on the information flow data in the user equipment, the search requirement of the user is determined and the corresponding search recommendation information is provided, so that the obtained search recommendation information is more conformable to the current search requirement of the user, which breaks the traditional approach in which the search is performed only based on the query information inputted by the user. Accordingly, the search efficiency is improved, and the accuracy of the recommendation information is enhanced. In addition, the method according to some embodiments of the present disclosure can organize the information flow data, which facilitates the determination of the search requirement of the user.

Figure 2:
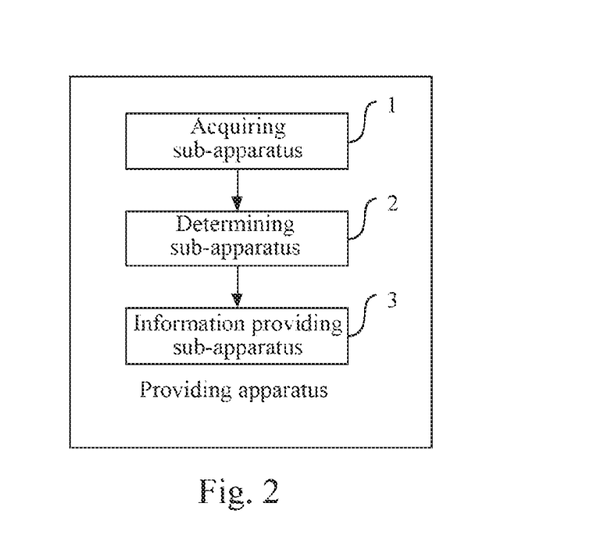
FIG. 2 illustrates a schematic structural diagram of a providing apparatus for providing search recommendation information according to some embodiments of the present disclosure.

FIG. 2 illustrates a schematic structural diagram of a providing apparatus for providing search recommendation information according to some embodiments of the present disclosure.

The providing apparatus according to some embodiments of the present disclosure includes: a sub-apparatus (hereinafter referred to as "acquiring sub-apparatus 1"), for acquiring, when a user performs a search in a user equipment, search reference information corresponding to the user; a sub-apparatus (hereinafter referred to as "determining sub-apparatus 2"), for determining search requirement information corresponding to the user based on the search reference information; and a sub-apparatus (hereinafter referred to as "information providing sub-apparatus 3"), for providing corresponding search recommendation information based on the search requirement information.

Referring to FIG. 2, when the user performs the search in the user equipment, the acquiring sub-apparatus 1 acquires the search reference information corresponding to the user.

The search reference information includes information flow data corresponding to one or more applications in the user equipment.

The information flow data includes data such as an operation, a notification, a short message, and a photograph.

Preferably, the search reference information may include information obtained by organizing the information flow data. For example, by performing a semantic analysis operation on the collected information flow data, the main information of the information flow data is used as the search reference information.

Preferably, the providing apparatus further includes a sub-apparatus (not shown, hereinafter referred to as "data collecting sub-apparatus"), for collecting one or more items of information flow data generated in the user equipment, to obtain corresponding search reference information based on the one or more items of information flow data and store the corresponding search reference information.

The data collecting sub-apparatus collects the one or more items of information flow data generated in the user equipment, to obtain the corresponding search reference information based on the one or more items of information flow data and store the corresponding search reference information.

Specifically, the providing apparatus may use time information and content information respectively corresponding to the collected one or more items of information flow data as the search reference information and store the search reference information.

Preferably, the providing apparatus includes a sub-apparatus (not shown, hereinafter referred to as "organizing sub-apparatus"), for organizing each item of information flow data in the collected information flow data in a predetermined form, to obtain the tag information corresponding to the each item of information flow data to be used as the search reference information and store the search reference information.

The organizing sub-apparatus is used for organizing the each item of information flow data in the collected information flow data in the predetermined form, to obtain the tag information corresponding to the each item of information flow data to be used as the search reference information and store the search reference information.

The tag information includes at least one of the following information.

1. Time information. The time information is used to indicate the time when the information flow data is generated.

2. Category information. The category information includes various types of information that may be used to classify the information flow data. For example, the information flow data is classified into "application notification," "short message," or "user operation" based on an information type.

3. Source information. The source information is used to indicate the application that generates the information flow data.

4. Content abstract information. The content abstract information includes text abstract information, for example, abstract information extracted from the content of the short message. Preferably, the content abstract information further includes abstract information obtained through the image recognition and the video recognition.

For example, when the user takes a high-definition selfie photo at Tiananmen, based on the user operation, the providing apparatus may use the information "daytime, Beijing Tiananmen, and sunny" obtained by performing the image recognition on the photo as the content abstract information.

5. Intent information. The intent information includes various kinds of information that may reflect search intents of the user. For example, based on a predetermined derivation rule acquired based on a large amount of user data, the intent information corresponding to the notification information of a shopping application is "online shopping" and "express inquiry." As another example, based on attributes of the user such as the gender, the age, and the occupation, the intent information corresponding to other similar users is used as the intent information of the user.

According to the first example of the present disclosure, the providing apparatus is included in the search application app_1 in the smart phone. When the smart phone receives the notification message "the order has been processed! The long-sleeve dress you purchased has been sent" from the shopping application app_2, the data collecting sub-apparatus collects the information flow data corresponding to the notification message. In addition, the organizing sub-apparatus organizes the information flow data in the predetermined form including five tags {time, category, source, content abstract, and intent}, to obtain the following search reference information info_1: the time: "9:00 pm on Apr. 5, 2016"; the category: "app notification"; the source: "app_2"; the content abstract: "the long-sleeve dress has been sent"; and the intent: "online shopping, and the long-sleeve dress." The providing apparatus stores the search reference information info_1 into the smart phone. When the user performs the search in the search application app_1, the acquiring sub-apparatus acquires the search reference information info_1 corresponding to the user in one day.

It should be noted that the above example is only for better describing the technical solution of the present disclosure, rather than limiting the present disclosure. It should be understood by those skilled in the art that any implementation where the one or more items of information flow data generated in the user equipment are collected, to obtain the corresponding search reference information based on the one or more items of information flow data and store the search reference information should be included in the scope of the present disclosure.

Preferably, the data collecting sub-apparatus may periodically perform the operation of collecting the one or more items of information flow data generated in the user equipment, to collect the newest information flow data in the user equipment.

Preferably, the data collecting sub-apparatus acquires an authorization setting operation of the user, to collect the one or more items of information flow data generated in the user equipment after being authorized by the user.

For example, the user may set access permissions for the information flow data such as the photograph, the short message, and the application notification in the user equipment. The data collecting sub-apparatus collects the one or more items of information flow data generated in the user equipment based on the access permissions set by the user.

Preferably, if the providing apparatus is included in the network device, the providing apparatus may receive the information flow data coming from the user equipment.

Further referring to FIG. 2, the determining sub-apparatus 2 determines the search requirement information corresponding to the user based on the search reference information.

The search requirement information includes various kinds of information for indicating search requirements of the user.

Specifically, the approaches of the determining sub-apparatus 2 determining the search requirement information corresponding to the user based on the search reference information includes, but not limited to, any one of the followings.

1. The content of the search reference information is directly used as the search requirement information.

2. A part of the search reference information is selected as the search requirement information. For example, after the category tag and the intent tag of the each item of information flow data are obtained through organizing, the content of the category tag and the content of the intent tag are used as the search requirement information.

3. The search requirement information corresponding to the user is determined based on user related information and the search reference information.

The user related information includes various kinds of attribute information related to the user, for example, the age, the occupation, the marital status, and the preference.

Preferably, the providing apparatus may determine the search requirement information corresponding to the user related information based on a predetermined matching rule between the attribute information and the requirement information.

The first example is further described. The providing apparatus acquires the user related information corresponding to the user. When the user related information includes "female, 25 years old, programmer, and unmarried," the providing apparatus determines the requirement matching the user "women's Spring and Autumn clothing, and Bohemian style" according to the user related information and the predetermined matching rule. The determining sub-apparatus 2 uses the search reference information and the requirement information determined based on the user related information as the search requirement information corresponding to the user. Thus, the obtained search requirement information is "online shopping, long-sleeve dress, women's Spring and Autumn clothing, and Bohemian style."

4. One or more keywords are extracted from the search reference information to be used as the search requirement information corresponding to the user.

Preferably, the determining sub-apparatus 2 includes a device (not shown, hereinafter referred to as "calculating device"), for calculating, when a plurality of pieces of candidate search requirement information are obtained, a weight of each piece of candidate search requirement information according to a predetermined weight calculation rule. In addition, the determining sub-apparatus 2 includes a device (not shown, hereinafter referred to as "sorting device"), for sorting the plurality of pieces of candidate search requirement information according to the weight of the each piece of candidate search requirement information, to select at least one piece of candidate search requirement information in the front rank.

When the plurality of pieces of candidate search requirement information are obtained, the calculating device calculates the weight of the each piece of candidate search requirement information according to the predetermined weight calculation rule. Then, the sorting device sorts the plurality of pieces of candidate search requirement information according to the weight of the each piece of candidate search requirement information, to select at least one piece of candidate search requirement information in the front rank.

Further referring to FIG. 2, the information providing sub-apparatus 3 provides the corresponding search recommendation information based on the search requirement information.

The search recommendation information includes search result information obtained based on the search requirement information.

Specifically, the information providing sub-apparatus 3 further includes a device (not shown, hereinafter referred to as "extension determining device"), for determining one or more pieces of extended query information corresponding to the search requirement information based on the search requirement information. In addition, the information providing sub-apparatus 3 further includes a device (not shown, hereinafter referred to as "extension searching device"), for performing the search based on the one or more pieces of extended query information, to obtain the corresponding search recommendation information.

The extension determining device determines the one or more pieces of extended query information corresponding to the search requirement information based on the search requirement information. Then, the extension searching device performs the search based on the one or more pieces of extended query information, to obtain the corresponding search recommendation information.

For example, when the user inputs "inquiry" in a search box to perform the search, the determining sub-apparatus 2 determines that the search requirement information corresponding to the user is "express." The extension determining device uses "express" as the extended query word, and the extension searching device performs the search based on "inquiry" and "express" to obtain the corresponding search recommendation information.

Preferably, the extension determining device includes a sub-device (not shown, hereinafter referred to as "extension providing sub-device"), for providing the one or more pieces of extended query information for the user to select.

The extension providing sub-device provides the one or more pieces of extended query information for the user to select. Then, the extension searching device performs the search based on the extended query information selected by the user to obtain the corresponding search recommendation information.

The first example is further described. Based on the search requirement information "online shopping, long-sleeve dress, women's Spring and Autumn clothing, and Bohemian style," the extension determining device uses "online shopping," "long-sleeve dress," "women's Spring and Autumn clothing," and "Bohemian style," as the extended query information. In addition, the extension providing sub-device provides the four pieces of extended query information for the user through a prompt box. When the user selects the "Bohemian style" and "women's Spring and Autumn clothing," the extension searching device performs the search based on the extended query information selected by the user, to obtain the corresponding search recommendation information.

Preferably, based on the query information inputted by the user and the one or more pieces of extended query information, the providing apparatus may present one or more kinds of corresponding search suggestion information for the user to select one kind of search suggestion information to perform the search.

For example, when the user inputs the query word "a" into the input box, and the extended query words collected by the providing apparatus are "b" and "c," the providing apparatus provides three kinds of search suggestion information "a+b," "a+c," and "a+b+c" in the input box for the user to select one to perform the search.

It should be noted that the above example is only for better describing the technical solution of the present disclosure, rather than limiting the present disclosure. It should be understood by those skilled in the art that any implementation where the corresponding search recommendation information is provided based on the search requirement information should be included in the scope of the present disclosure.

According to the solution of some embodiments of the present disclosure, based on the information flow data in the user equipment, the search requirement of the user is determined and the corresponding search recommendation information is provided, so that the obtained search recommendation information is more conformable to the current search requirement of the user, which breaks the traditional approach in which the search is performed only based on the query information inputted by the user. Accordingly, the search efficiency is improved, and the accuracy of the recommendation information is enhanced. In addition, the solution according to some embodiments of the present disclosure can organize the information flow data, which facilitates the determination of the search requirement of the user.

The software program of some embodiments of the present disclosure may be executed by a processor to implement the steps or functions described above. Likewise, the software program (including a related data structure) of some embodiments of the present disclosure may be stored in a computer readable recording medium, for example, a RAM memory, a magnetic or optical driver, a floppy disk or the like. In addition, some of the steps or functions of some embodiments of the present disclosure may be implemented using hardware. For example, the hardware is a circuit cooperating with the processor to perform various functions or steps.

Additionally, a portion of some embodiments of the present disclosure may be applied as a computer program product, for example, a computer program instruction. When the instruction is executed by the computer, the method and/or technical solution according to some embodiments of the present disclosure may be invoked or provided through the operation of the computer. The program instruction for invoking the method of some embodiments of the present disclosure may be stored in a fixed or removable recording medium, transmitted by a data stream in a broadcast or other signal carrying media, and/or stored in the working memory of the computer device executed according to the program instruction. Herein, an embodiment in accordance with the present disclosure includes an apparatus including a memory for storing a computer program instruction and a processor for executing the program instruction. When the computer program instruction is executed by the processor, the apparatus is triggered to perform the method and/or technical solution based on the plurality of embodiments according to the present disclosure.

It is obvious to those skilled in the art that the present disclosure is not limited to the details of the above exemplary embodiments, and the present disclosure can be implemented in other specific forms without departing from the spirit or essential characteristics of the present disclosure. Therefore, in any respect, the embodiments are regarded as illustrative and non-limiting. The scope of the present disclosure is defined by the appended claims, rather than the above description. Thus, the meanings of equivalent elements fallen into the claims and all the variations within the scope are intended to be included in the present disclosure. Any reference numeral in the claims should not be regarded as limiting the claims. In addition, it is obvious that the term "comprising" does not exclude other units or steps. The feature in singular form does not exclude the features in plural form. The plurality of units or devices described in the system claims may also be implemented by one unit or device by means of software or hardware. The expressions such as first, and second are used to represent names, and do not represent any specific order.

What is claimed is:

1. A method for providing search recommendation information, comprising:
   acquiring, in response to determining that a user performs a search in a user equipment, search reference information corresponding to the user, the search reference information comprising information flow data corresponding to one or more applications in the user equipment;
   determining search requirement information corresponding to the user based on the search reference information, the determining comprising:
   obtaining a plurality of pieces of candidate search requirement information, and calculating a weight of each piece of candidate search requirement information according to a predetermined weight calculation rule; and
   sorting the plurality of pieces of candidate search requirement information according to the weight of the each piece of candidate search requirement information, to select at least one piece of candidate search requirement information in a front rank; and
   providing corresponding search recommendation information based on the search requirement information,
   wherein the method is performed by at least one hardware processor.

2. The method according to claim 1, further comprising:
   collecting one or more items of information flow data generated in the user equipment, to obtain corresponding search reference information based on the one or more items of the information flow data and store the corresponding search reference information.

3. The method according to claim 2, wherein the collecting one or more items of information flow data generated in the user equipment comprises:
   acquiring an authorization setting operation of the user, to collect the one or more items of the information flow data generated in the user equipment after an authorization of the user.

4. The method according to claim 2, further comprising:
   organizing each item of collected information flow data in a predetermined form, to obtain tag information corresponding to the each item of the information flow data to be used as the search reference information.

5. The method according to claim 4, wherein the tag information comprises at least one of:
   time information;
   category information;
   source information;
   content abstract information; or
   intent information.

6. The method according to claim 1, wherein the determining search requirement information corresponding to the user based on the search reference information comprises:
  determining the search requirement information corresponding to the user based on user related information of the user and the search reference information.

7. The method according to claim 1, wherein the determining search requirement information corresponding to the user based on the search reference information comprises:
  extracting one or more keywords from the search reference information to be used as the search requirement information corresponding to the user.

8. The method according to claim 1, wherein the providing corresponding search recommendation information based on the search requirement information comprises:
  determining one or more pieces of extended query information corresponding to the search requirement information based on the search requirement information; and
  performing a search based on the one or more pieces of extended query information, to obtain the corresponding search recommendation information.

9. A non-transitory computer storage medium storing a computer program, the computer program when executed by one or more processors, causes the one or more processors to perform operations, the operations comprising:
  acquiring, in response to determining that a user performs a search in a user equipment, search reference information corresponding to the user, the search reference information comprising information flow data corresponding to one or more applications in the user equipment;
  determining search requirement information corresponding to the user based on the search reference information, the determining comprising:
    obtaining a plurality of pieces of candidate search requirement information, and calculating a weight of each piece of candidate search requirement information according to a predetermined weight calculation rule; and
    sorting the plurality of pieces of candidate search requirement information according to the weight of the each piece of candidate search requirement information, to select at least one piece of candidate search requirement information in a front rank; and
  providing corresponding search recommendation information based on the search requirement information.

10. The computer storage medium according to claim 9, the operations further comprising:
  collecting one or more items of information flow data generated in the user equipment, to obtain corresponding search reference information based on the one or more items of the information flow data and store the corresponding search reference information.

11. The computer storage medium according to claim 10, wherein the collecting one or more items of information flow data generated in the user equipment comprises:
  acquiring an authorization setting operation of the user, to collect the one or more items of the information flow data generated in the user equipment after being authorized by the user.

12. The computer storage medium according to claim 10, the operations further comprising:
  organizing each item of collected information flow data in a predetermined form, to obtain tag information corresponding to the each item of the information flow data to be used as the search reference information.

13. The computer storage medium according to claim 12, wherein the tag information comprises at least one of:
  time information;
  category information;
  source information;
  content abstract information; or
  intent information.

14. The computer storage medium according to claim 9, wherein the determining search requirement information corresponding to the user based on the search reference information comprises:
  determining the search requirement information corresponding to the user based on user related information of the user and the search reference information.

15. The computer storage medium according to claim 9, wherein the determining search requirement information corresponding to the user based on the search reference information comprises:
  extracting one or more keywords from the search reference information to be used as the search requirement information corresponding to the user.

16. The computer storage medium according to claim 9, wherein the providing corresponding search recommendation information based on the search requirement information comprises:
  determining one or more pieces of extended query information corresponding to the search requirement information based on the search requirement information; and
  performing a search based on the one or more pieces of extended query information, to obtain the corresponding search recommendation information.

17. The computer storage medium according to claim 16, wherein the determining one or more pieces of extended query information corresponding to the search requirement information based on the search requirement information comprises:
  for providing the one or more pieces of extended query information for the user to select,
  wherein the performing the search based on the one or more pieces of extended query information, to obtain the corresponding search recommendation information comprises:
  performing the search based on the extended query information selected by the user to obtain the corresponding search recommendation information.

18. A non-transitory computer program product, the computer program product, when executed by a computer device, causes the computer device to perform operations, the operations comprising:
  acquiring, in response to determining that a user performs a search in a user equipment, search reference information corresponding to the user, the search reference information comprising information flow data corresponding to one or more applications in the user equipment;
  determining search requirement information corresponding to the user based on the search reference information, the determining comprising:
    obtaining a plurality of pieces of candidate search requirement information, and calculating a weight of each piece of candidate search requirement information according to a predetermined weight calculation rule; and
    sorting the plurality of pieces of candidate search requirement information according to the weight of the each piece of candidate search requirement information, to select at least one piece of candidate search requirement information in a front rank; and providing corresponding search recommendation information based on the search requirement information.

\* \* \* \* \*